United States Patent
McParland

(10) Patent No.: US 9,085,222 B1
(45) Date of Patent: Jul. 21, 2015

(54) ELECTRICAL PROPULSION AND RECHARGING TECHNOLOGY FOR HEAVY DUTY VEHICLES

(71) Applicant: David Brian McParland, Boca Raton, FL (US)

(72) Inventor: David Brian McParland, Boca Raton, FL (US)

(73) Assignees: David Brian McParland, Boca Raton, FL (US); Maria Hills McParland, Boca Raton, FL (US)

( * ) Notice: Subject to any disclaimer, the term of this patent is extended or adjusted under 35 U.S.C. 154(b) by 0 days.

(21) Appl. No.: 13/815,108

(22) Filed: Jan. 31, 2013

(51) Int. Cl.
| | |
|---|---|
| *B60K 1/02* | (2006.01) |
| *B60K 1/00* | (2006.01) |
| *B60K 1/04* | (2006.01) |
| *B60K 17/02* | (2006.01) |
| *B60K 17/04* | (2006.01) |

(52) U.S. Cl.
CPC ...... *B60K 1/00* (2013.01); *B60K 1/04* (2013.01); *B60K 17/02* (2013.01); *B60K 17/04* (2013.01)

(58) Field of Classification Search
USPC ........ 180/65.1, 65.285, 65.31, 65.6; 903/906, 903/909, 951
See application file for complete search history.

(56) References Cited

U.S. PATENT DOCUMENTS

| | | | | |
|---|---|---|---|---|
| 4,270,622 | A * | 6/1981 | Travis | 180/65.31 |
| 5,224,563 | A * | 7/1993 | Iizuka et al. | 180/65.21 |
| 5,327,987 | A * | 7/1994 | Abdelmalek | 180/65.25 |
| 5,696,438 | A * | 12/1997 | Hamilton | 322/12 |
| 5,704,440 | A * | 1/1998 | Urban et al. | 180/65.23 |
| 7,661,495 | B2 * | 2/2010 | Zohrer et al. | 180/65.22 |
| 2007/0095587 | A1 * | 5/2007 | DuCharme | 180/65.3 |

* cited by examiner

Primary Examiner — John Walters

(57) ABSTRACT

The electric heavy duty vehicle with combination of power storage or energy the on board electric charging and propulsion; the present invention is alternative energy design for electrical vehicles replacing the need for gasoline or other traditional fossil fuel.

2 Claims, 7 Drawing Sheets

ELECTRICAL PROPULSION AND RECHARGING TECHNOLOGY FOR HEAVY DUTY VEHICLES

Figure 1:
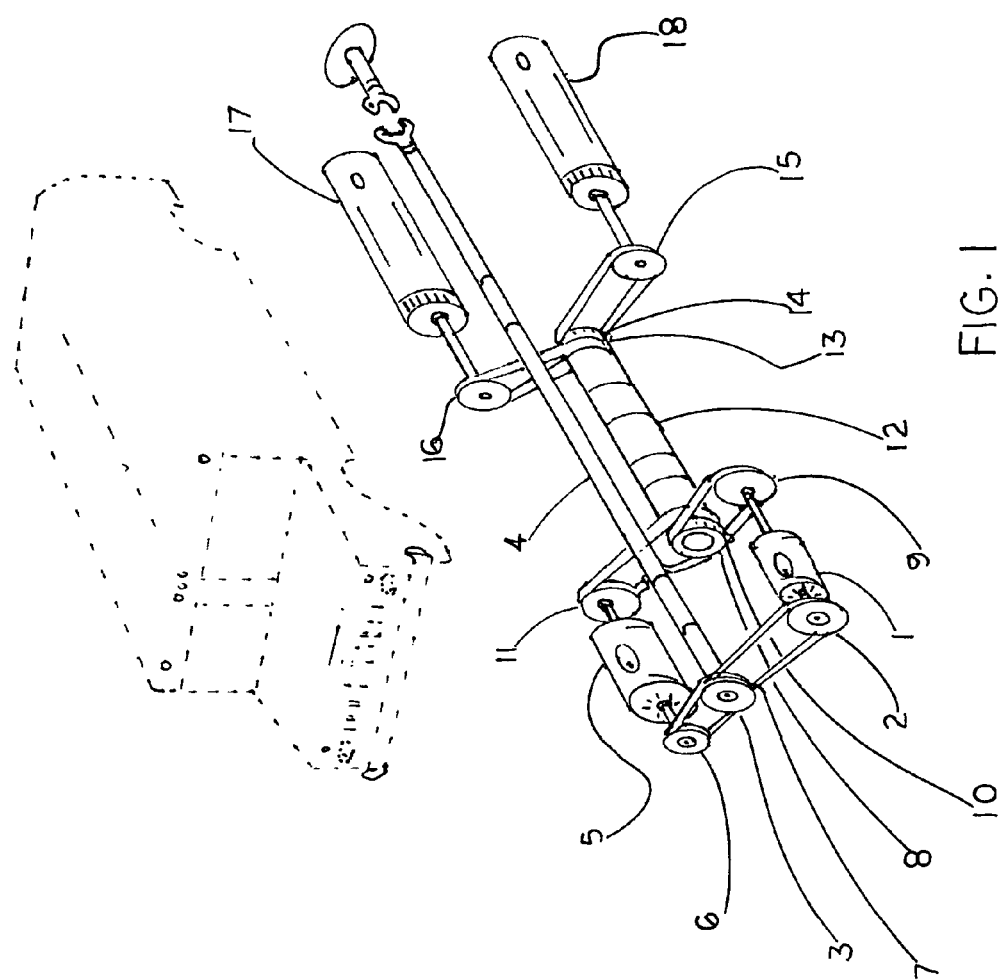

Priority: Related Applications: This application Ser. No. 13/815,108 is a continuation-in-part application of application Ser. No. 12/804,256, filed Oct. 14, 2010 now abandoned which is a continuation of application 61/214,371 filed Sep. 8, 2009.

PRIOR ART

There are four methods that show different ideas to heavy duty electric vehicles or hybrid vehicle also several automotive inventions with various mechanisms.

Hydrogen system creates CO2 this is release into the atmosphere under heavy electrical demand the recombination process create water this water will freeze on the road or freezing fuel cells. The fuel cell requires approximately 3,000 times more space than gasoline shown in U.S. Patent Number 20080277175 A1. Internal combustion powered vehicles cost or weight or maintenance needed to alter fossil fuel emissions is high the health of our children exposure to chemical cocktail emissions or green house gas emission and noise pollution are global. Mass transit use the parallel hybrid the diesel motor also the generator that send recharge current to batteries the diesel power plant maintains speed of the vehicle. Amorphous silicon output is limited to panel size and difficult to fit system on a moving vehicle also demands the sunlight to create energy night driving would be limited. U.S. Patent Number EP1331127A2. The motor are directly affixed to an axle and drive the planetary spider assembly the motor is locked to axle continually rotate. Heavy duty application could require AC or large DC motor for each wheel considerable power source is required. If generator combination motors are used the still or slow axle rotation may not generate enough current to recharge or current to drive the other axle motor or motors. U.S. Pat. No. 5,704,440 use several method of recharging via transmission and solenoid clutch or the inter combustion engine. The presented invention power supply is insulated for the cold and vent fumes the use of electromagnetic clutches with both electric motors perpendicular link to the quad driver of the connector eliminating the need for a transmission. Wheel or axle shaft or transmission shaft to transfer torque is not require in present invention that incorporates the electromagnetic clutch on either generator when engage the rotation will recharge power source. The U.S. Pat. No. 5,224,563 shows a hollow shaft with a shaft passing inside to transfer torque and the unknown clutch system the present invention design show a semi hollow shaft with no shaft pass inside the semi hollow this design allow for increase or decrease in diameter and add strength; also allow space to weld from the inside to affix the electromagnetic clutch assembly.

SUMMARY OF THE INVENTION

The present invention specifically address above short coming above; limited driving range and the introduction of a green school bus the green electric heavy duty system can fit in the existing frame under the floor of the bus or truck and by removing the diesel or gas engine the transmission the fuel and the fuel tanks the exhaust piping the emission system will create the space to install the said electric system of the present invention and can assist in the reshaping of green transportation.

Driving range is increase using dual generators and dual power source this will allow one generator to charge one power source and the electric motors can draws current from the opposite power source this is a alternating recharging design and will save plug in charging time. The front driver will received rotational energy thru perpendicular link from either electromagnetic clutch of either electric motor the rear of the connector will deliver transfer rotational energy thru perpendicular link to the front of either generators the rotation of either generator or both generators at the same time will recharge the power source. Each generator and the electric motors are managed and electromagnetically engage to cycle on or off by a computer processor unit and programmable logic controller directing power respond for maximum charge and simple quiet green electric motor rotational energy. The electric motors front output shaft is perpendicular lined to the driver 3 and the connector (4) will transmit rotational energy to (23) connector yoke fixed to a yoke transmitting rotation energy to rear drive and rear wheels. The high horse power electric motor electromagnetically engage for high rotational energy demand the low horsepower electric motor will electromagnetically engage to maintain cruising speed.

SUMMARY OF THE INVENTION

The present invention with alternate design to improve the problems set as follow.

To remedy clean transportation for student commuting to school by bus to increasing driving range and lower emission as follow; utilizing high horse power electric motor for heavy rotational energy demand or using the low horse power electric motor for maintaining cruising speed; The front output shaft of both electric motors have affix electromagnetic clutch when the clutch is engage rotational energy is transfer with perpendicular link to the quad driver of the connector converting electrical energy into rotational energy to propel the vehicle. The rear output shaft of both electric motors have affix electromagnetic clutch when the clutch is engage rotational energy is transfer with perpendicular links to the front dual driver of the semi hollow driver this rotating driver has the electromagnetic clutch affix on the rear the design allows the semi hollow driver to cycle on or off controlling both generators rotation; To maximize the on board generators both have front mounted electromagnetic clutch this allow each generator to cycle individually; the computer processing unit and programmable logic controller direct the electromagnetic clutch system to maximize electricity consumption or charging time or electric motor operation.

BRIEF DESCRIPTION OF THE DRAWINGS FIGURES

FIG. 1 The perspective view of the battery electric heavy duty vehicle to be adapted to a frame for use of the present invention.

Figure 2:
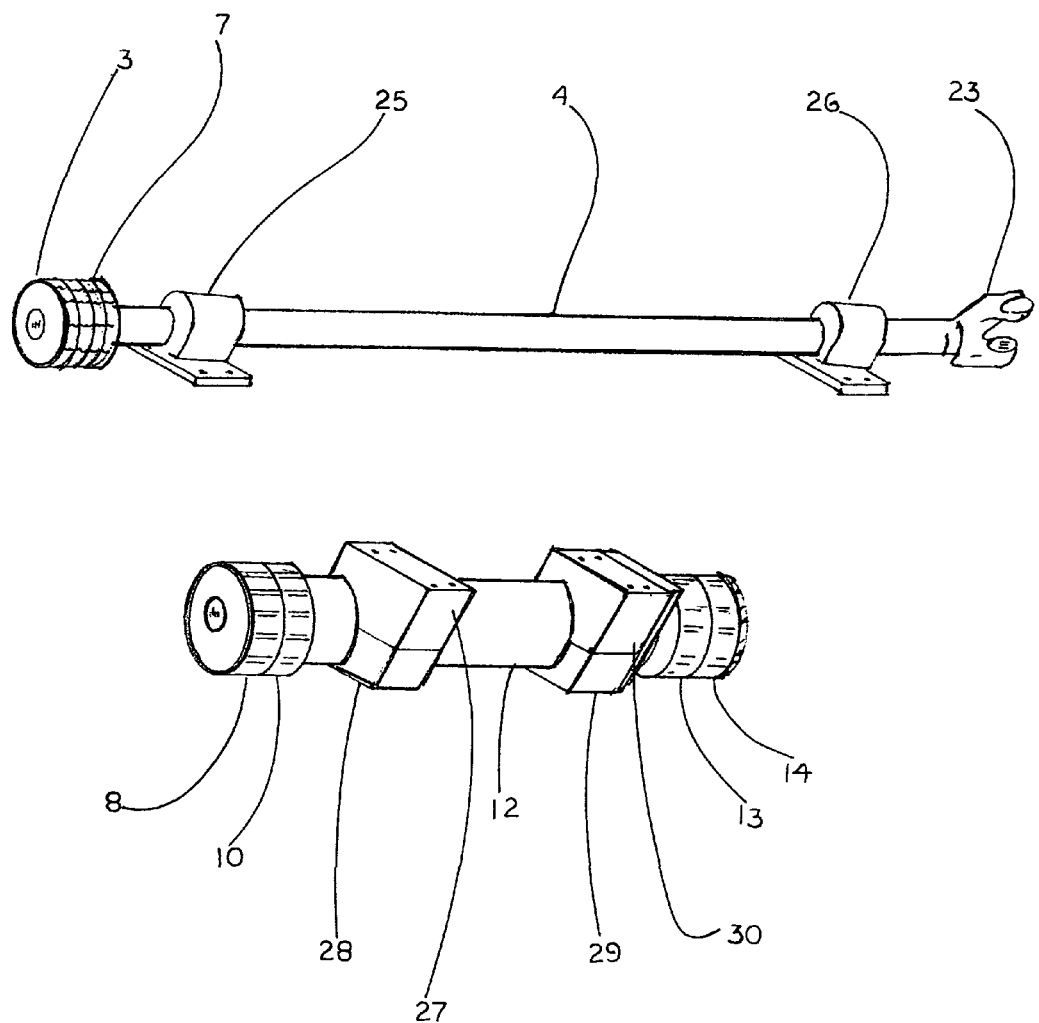

FIG. 2 The assembled view of connector and driver of the present invention.

Figure 3:
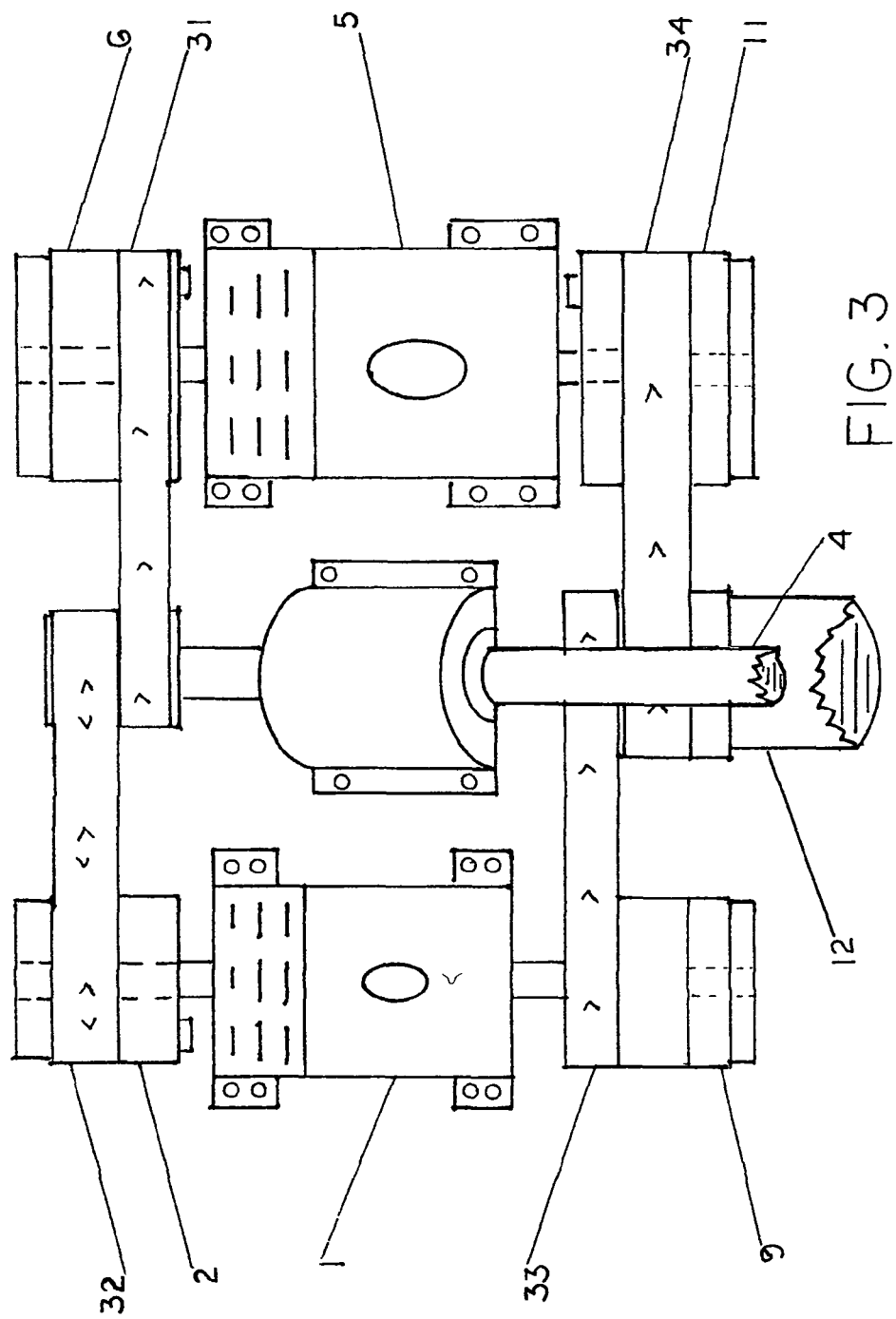

FIG. 3 The top view of the electromagnetic clutch set attached to electric traction motors with perpendicular link of belts or chains or rotational transmission.

Figure 4:
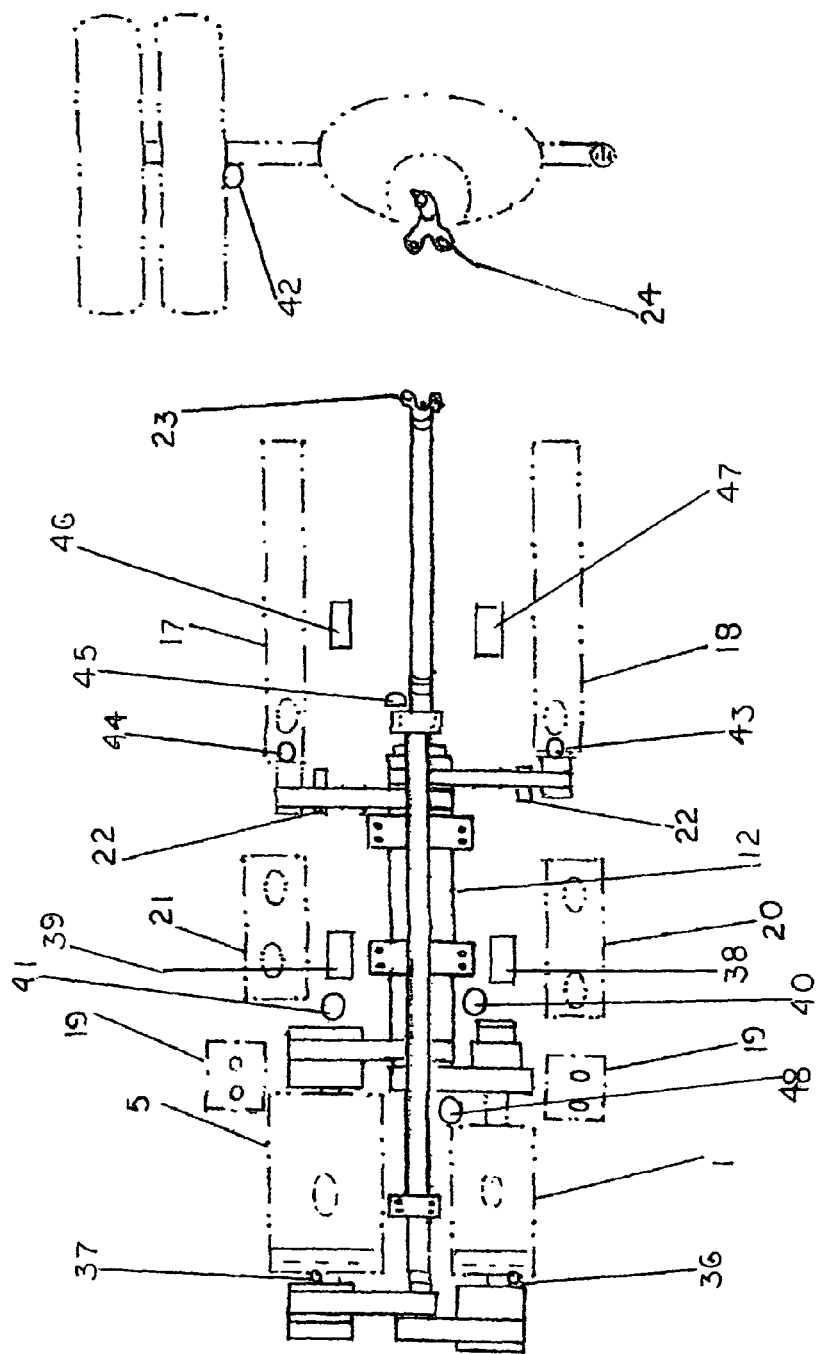

FIG. 4 The top view of a battery electric heavy duty vehicle showing connector above driver with electrical component.

Figure 5:
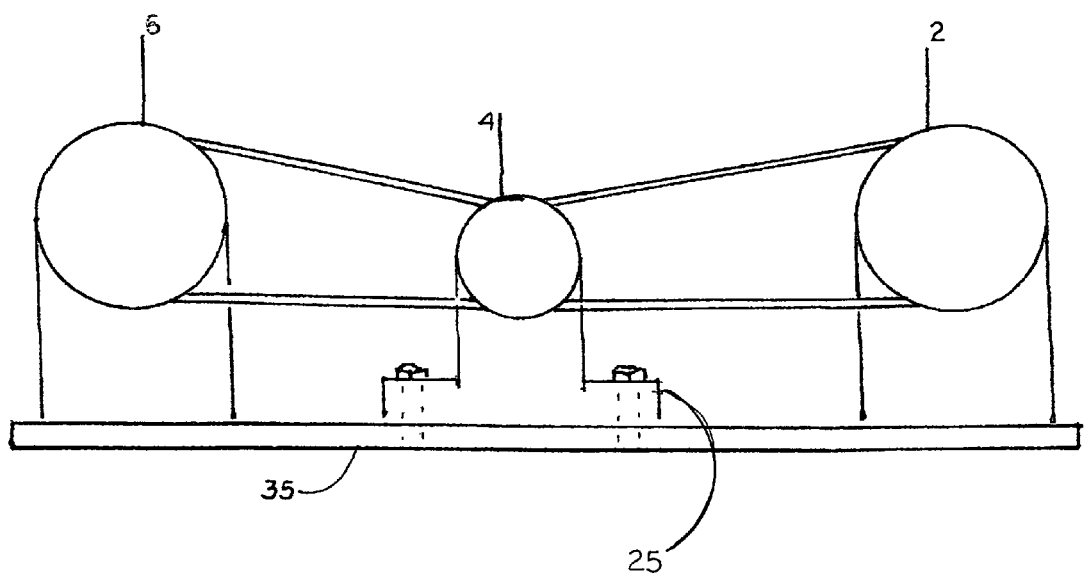

FIG. 5 The front view of the connector mounted on the mount plate with the perpendicular link to the low electromagnetic clutch and high electromagnetic clutch.

Figure 6:
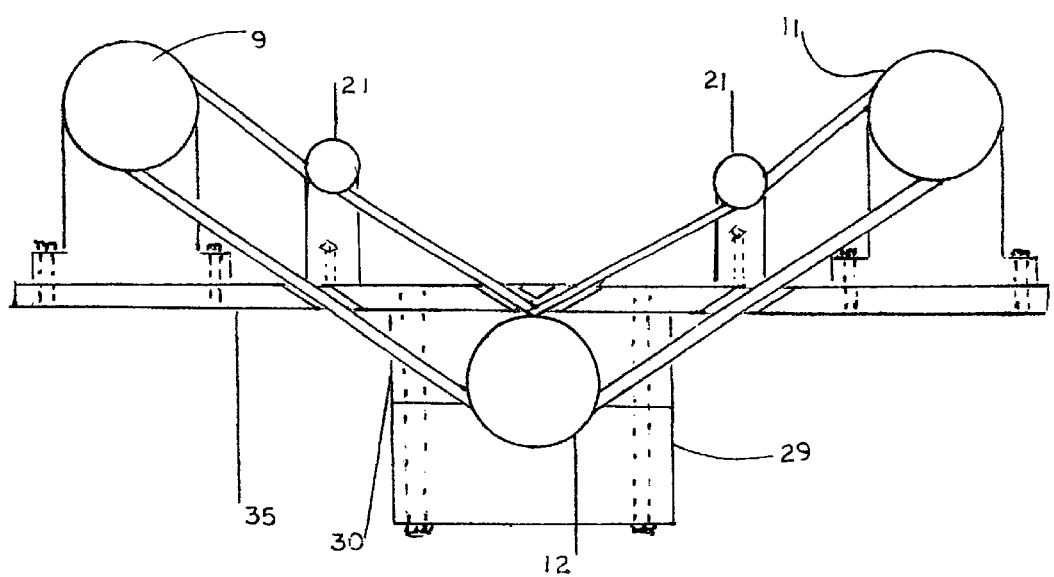

FIG. 6 The front view as view from rear showing generator driver mounted to the underside of plate with perpendicular links to the electrical traction motors left rear or right rear electromagnetic clutch.

Figure 7:
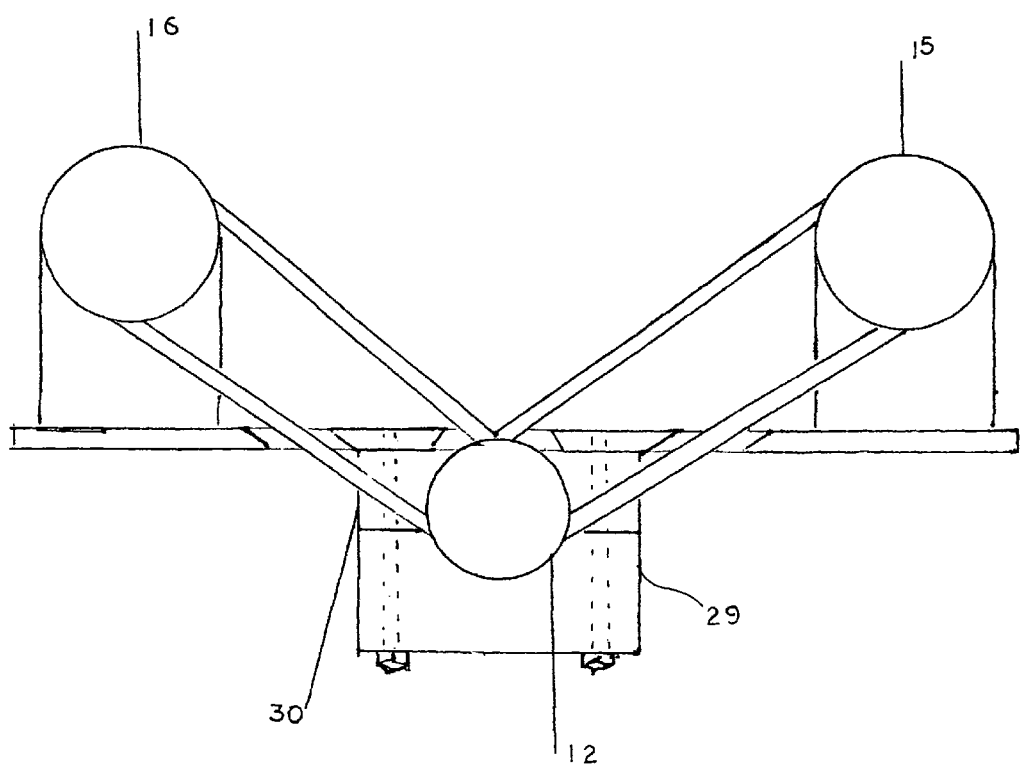

FIG. 7 The front view of the driver with perpendicular link to the front of the generators.

PARTS LIST

1. Low traction motor
2. low electromagnetic clutch
3. drive gear
4. connector
5. high traction motor
6. high electromagnetic clutch
7. high drive gear
8. low driver gear
9. low recharge electromagnetic clutch
10. high drive gear assembly
11. high recharge electromagnetic clutch
12. generator driver
13. right electromagnetic clutch with synchronous gear
14. left electromagnetic clutch with synchronous gear
15. left generator electromagnetic clutch with synchronous gear
16. right generator electromagnetic clutch with synchronous gear
17. right generator
18. left generator
19. auxiliary batteries
20. left battery source
21. right battery source
22. idlers tensioners
23. connector yoke
24. yoke

PARTS LIST 25. front connector bearing assembly
26. rear connector bearing assembly
27. driver support bearing with cap
28. top driver bearing cap
29. rear top driver bearing with cap
30. rear bottom driver support bearing
31. high connector belt or chain or rotational transmission
32. low connector belt or chain or rotational transmission
33. low recharge belt or chain or rotational transmission
34. high recharge belt or chain or rotational transmission
35. steel mount plate
36. low electric traction motor rpm sensor
37. high electric traction motor rpm sensor
38. left battery monitor
39. right battery monitor
40. optical isolator
41. Programmable logic controller-central processor unit
42. wheel speed sensor
43. left generator voltage sensor
44. right generator voltage sensor
45. connector rpm sensor
46. right motor controller
47. left motor controller

DETAILED EMBODIMENT

The electric traction motors (1, 5) and generators (17, 18) and connector (4) are mounted horizontally on the top of steel mount plate (35).

The throttle position sensor (48) send signal to computer processing unit (41) when receiving input signal from motor rpm sensor (36, 37) connector sensor (45) wheel speed sensor (42) the low traction motor (1) or high traction motor (5) and low electromagnetic clutch (2) or high electromagnetic clutch (6) to energize this rotation is transfer using perpendicular link of belts, chains, or rotation transmission (31, 32) to the connector drive gear (3) this rotation is transfer thru the connector (4) to connector yoke (23) to any flange yoke converting electrical energy into rotation energy to propel the said heavy-duty vehicle. The high electromagnetic clutch (6) and high traction motor (5) will energize to start the vehicle motion. The traction motor (1) and low electromagnetic clutch (2) will energize to maintain vehicle speed. High current will travel from power source (20,21) to motor controllers (46, 47) to either electric traction motors (1,5).

The front of connector (4) is balance with front connector needle bearing assembly (25) and bolted vertically to the top of steel mount plate (35) the rear of the connector (4) is balance using rear connector needle bearing assembly (26) and bolts vertically to the top of steel mount plate (35).

The electromagnetic clutches (9, 11) and the low and high drivers (8, 10) rotate the generator driver (12) using fixed electromagnetic clutches (13, 14) and perpendicularly links the generators' electromagnetic clutches (15, 16) such that it is fixed to the generators (17, 18), producing voltage to recharge the battery source (20, 21).

The front of the driver (12) is supported with the top driver bearing cap (28) vertically mounted with bolts to the FIG. 6 steel mounting plate (35) the driver (12) is support by double-row double-seal cylindrical roller support bearing with cap (27) vertically mounted with bolts to the bottom of the FIG. 6 steel mount plate (35)

The rear top bearing cap (29) and rear bottom support double row double-seal cylindrical roller bearing with cap (30) balance the rear of the driver vertical mounted bolts hold caps to the bottom of the FIG. 6 steel mount plate (35).

Electric motors front output shaft is perpendicular linked to the driver (3) the connector (4) will transmit rotational energy connector yoke (23) fixed to yoke (24) transmitting rotation energy to rear drive and rear wheels. The high horse power electric motor (5) electromagnetically engage for high rotational energy demand the low horsepower electric motor (1) will electromagnetically engage to maintain cruising speed.

The throttle position sensor (48) send a signal to computer processing unit (41) when receiving information from wheel speed sensor (42) or motor rpm speed sensor (36, 37) and programmable logic controller (41) battery voltage monitor (38, 39) when a low battery voltage condition exist detected by battery monitors' (38,39) and the voltage sensors (43, 44) the generator or generators (17, 18) will cycle on energizing the left or right electromagnetic clutch (9, 11) the low electromagnetic clutch (2) and low traction motor (1) or high electromagnetic clutch (6) and high traction motor (5) will engage either transferring rotational energy the rear spline output shaft with fixes electromagnetic clutch (9,11) using perpendicular link of synchronous gear belt or chains or gears (33, 34) will transfer rotational energy of driver (12) cycling on the electromagnetic clutch (13,14) this is a single electromagnetic clutch with dual gears. Depending on system demand electromagnetic clutch (15) can energize turning one generator (18) or electromagnetic clutch (16) energizes turning the second generator (17) sending voltage back to power supply (20, 21).

The invention claimed is:
1. A heavy duty electric vehicle comprising a mounting frame having rotatable wheels mounted thereon, a low trac- tion electric motor, a high traction electric motor, a low recharge electric generator, and a high recharge electric generator, wherein said low traction electric motor and said high traction electric motor and said low recharge electric generator and said high recharge electric generator are mounted in said heavy duty electric vehicle, and wherein said low traction electric motor and said high traction electric motor are capable of producing rotational energy and are further provided with a first electromagnetic clutch capable of transmitting torque from either said low traction electric motor or said high traction electric motor to a drive gear attached to a connector wherein said connector is affixed to a connector yoke to thereby transfer rotational energy from either said low traction electric motor or said high traction electric motor to said rotatable wheels, and wherein there is further provided a low drive gear assembly and a high drive gear assembly wherein both said low drive gear assembly and said high drive gear assembly are affixed to a generator driver to thereby transfer rotational energy to a generator, and further wherein there is provided a second electromagnetic clutch capable of transmitting torque from either said low traction electric motor or high traction electric motor to said generator driver and thereby capable of transferring torque to either said low recharge electric generator or said high recharge electric generator.

2. A heavy duty electric vehicle comprising a mounting frame having rotatable wheels mounted thereon and an electric motor mounted in said heavy duty electric vehicle wherein said electric motor is capable of producing rotational energy and including a low drive gear assembly and a high drive gear assembly fixed to a generator driver to thereby transfer rotational energy to a generator and further wherein said electric motor consists of a low traction electric motor and wherein said generator comprises a low recharge electric generator and further including a high traction electric motor and a high recharge electric generator.

* * * * *